(12) United States Patent
Kumaran et al.

(10) Patent No.: US 8,923,822 B2
(45) Date of Patent: Dec. 30, 2014

(54) METHOD AND APPARATUS FOR MANAGING INTERRUPTIONS FROM DIFFERENT MODES OF COMMUNICATION

(75) Inventors: Vikram Kumaran, Cary, NC (US); John Christopher Cottrell, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 32 days.

(21) Appl. No.: 13/462,240

(22) Filed: May 2, 2012

(65) Prior Publication Data

US 2013/0295973 A1 Nov. 7, 2013

(51) Int. Cl.
*H04M 1/725* (2006.01)
(52) U.S. Cl.
USPC .............. 455/412.2; 455/414.1; 455/415; 455/417; 379/88.21; 379/210.01; 379/211.02
(58) Field of Classification Search
CPC   H04W 4/12;  H04L 12/5895;  H04M 3/42229; H04M 3/42272
USPC ............ 455/412.1, 412.2, 413, 414.1–414.4, 455/415–417, 425, 567; 379/201.01, 379/201.02, 201.07–201.08, 211.02, 379/88.21–88.24, 210.01–210.02
See application file for complete search history.

(56) References Cited

U.S. PATENT DOCUMENTS

| | | | | |
|---|---|---|---|---|
| 8,443,049 | B1 * | 5/2013 | Geddes | .......................... 709/207 |
| 2005/0047562 | A1 * | 3/2005 | Holz et al. | ................. 379/88.22 |
| 2006/0248183 | A1 * | 11/2006 | Barton | .......................... 709/224 |

OTHER PUBLICATIONS

Youn et al., A Comparative Study for Email Classification, Advances and Innovations in Systems, Computing Sciences and Software Engineering 387-91 (2007), available at http://sir-lab.usc.edu/publications/Youn-CISSE.pdf.
Cufoglu et al., A Comparative Study of Selected Classification Accuracy in User Profiling, 7th Int'l Conference on Machine Learning and Applications 787-91 (2008).
Kohavi, R., Scaling Up the Accuracy of Naive-Bayes Classifiers: A Decision-Tree Hybrid, KDD 202-07 (1996).

* cited by examiner

*Primary Examiner* — Wayne Cai
(74) *Attorney, Agent, or Firm* — Meunier Carlin & Curfman, LLC (57) ABSTRACT

Methods and apparatus for managing interruptions in a multiple communication mode environment are provided herein. For example, a method may include receiving at least first and second instances of communication data associated with first and second communication modes; obtaining first and second attribute data related to the first and second instances of communication data; classifying the first and second instances of communication data into first and second categories based on the first and second attribute data using the interruption management device; and determining whether to interrupt a user by delivering the first instance of communication data or the second instance of communication data based on the first and second categories, respectively. The first category and the second category may be selected from a plurality of predetermined categories using a classification algorithm. The first communication mode may be different than the second communication mode.

17 Claims, 5 Drawing Sheets

METHOD AND APPARATUS FOR MANAGING INTERRUPTIONS FROM DIFFERENT MODES OF COMMUNICATION

BACKGROUND

Individuals have many modes of communication (i.e., telephone, cell phone, email, text messaging, instant messaging, etc.) available to them, and can choose among the available modes of communication in order to boost their productivity. For example, it may be more efficient to communicate with a colleague using an instant message or a family member using a text message. Alternatively, in some circumstances, it may be desirable to communicate via email or phone.

However, having many modes of communication available may also be a burden. This is especially the case when individuals are trying to concentrate and avoid interruptions. For example, research has shown that too much multi-tasking, or switching from one project to another, may lead to inefficiencies and mistakes. At this time, individuals are forced to individually turn off modes of communication in order to avoid interruptions. Thus, they lack the ability to filter or fine tune to achieve a tolerable level of interruption based on specific needs and circumstances.

Further, individuals may be subject to targeted and/or personalized marketing (i.e., interruptions). Targeted marketing comes in a variety of different forms such as e-signage, augmented reality, social media-driven solicitations for goods and services, etc. For example, a person walking down a street may receive a barrage of targeted marketing on his mobile device through many different modes of communication. Similarly to above, there is no way to filter to achieve a tolerable level of targeted marketing. Instead of turning off his mobile device, the person may prefer to customize a filter in order to receive only targeted marketing that matches his immediate interest.

SUMMARY

An individual may be capable of setting a tolerable level of interruption based on the individual's specific needs and circumstances. For example, the individual may set the desired level of interruption using an interruption manager. After setting a desired level of interruption, the interruption manager may be configured to throttle interruptions received through a plurality of communications modes including, but not limited to, email, text message, instant message and voice message. The interruptions may also be related to any subject such as work, personal, targeted-marketing or any other subject, for example. The interruption manager may utilize an individualized profile in order to throttle communications to the individual.

For example, methods and apparatus for managing interruptions in a multiple communication mode environment are provided herein. In an example implementation, a method for managing interruptions using an interruption management device may include: receiving at least a first instance of communication data associated with a first communication mode and a second instance of communication data associated with a second communication mode; obtaining first attribute data related to the first instance of communication data and second attribute data related to the second instance of communication data; classifying the first instance of communication data into a first category based on the first attribute data and the second instance of communication data into a second category based on the second attribute data using the interruption management device; and determining whether to interrupt a user by delivering the first instance of communication data or the second instance of communication data based on the first and second categories, respectively. The first category and the second category may be selected from a plurality of predetermined categories using a classification algorithm, and the first communication mode may be different than the second communication node.

In addition, the method may include storing the first instance of communication data or the second instance of communication data under the condition that the user is not to be interrupted.

Optionally, the first and second categories may be a same or a different one of the predetermined categories.

Alternatively or additionally, the method may include: receiving an interruption threshold level at the interruption management device; determining whether to interrupt a user by comparing the first category and the second category to the interruption threshold level; and interrupting the user by delivering the first instance of communication data or the second instance of communication data when the first category or the second category equals or exceeds the interruption threshold level, respectively. The interruption threshold level may be associated with at least one of the predetermined categories.

In another example implementation, the method may include: receiving a set of historical communication data including a plurality of instances of communication data associated with at least one communication mode; obtaining attribute data associated with each instance of communication data in the set of historical communication data; and constructing a classification model for the classification algorithm using the attribute data associated with each instance of communication data included in the set of historical communication data.

In yet another implementation, the method may include: receiving feedback from the user regarding accuracy of results of the classification; and modifying the classification model based on the feedback.

In some implementations, the classification algorithm may be a data tree classification, a Naive-Bayes classification or a hybrid data tree-Naive-Bayes classification.

Alternatively or additionally, each of the first attribute data and the second attribute data may be information related to an author of the instance of communication data, a type of communication mode with which the instance of communication data is associated or a descriptive keyword included in the instance of communication data.

Further, the multiple communication modes may include an email service, a text message service, an instant message service or a voice message service.

In addition, the first instance of communication data and the second instance of communication data may be targeted marketing messages.

In another example implementation, a non-transient computer-readable recording medium having computer-executable instructions stored thereon that, when executed by an interruption management device, cause the interruption management device to perform interruption management in a multiple communication mode environment.

In yet another implementation of the invention, an interruption management device for managing interruptions in a multiple communication mode environment may be provided.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for managing text-based messages received through different modes of communication, it will become evident to those skilled in the art that the implementations are not limited thereto, but are applicable for managing any type message content associated with different modes of communication.

Figure 1A:
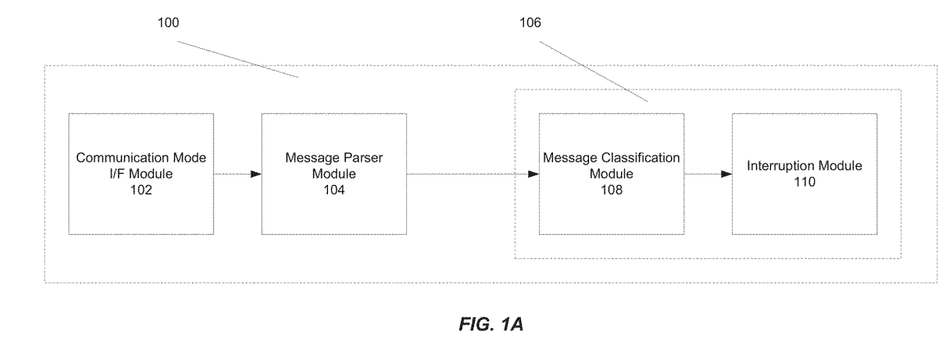
FIG. 1A is a simplified block diagram illustrating an interruption manager for use in a multiple communication mode environment.

Referring to FIG. 1A, an interruption manager 100 for use in a multiple communication mode environment is shown. In an example implementation, the interruption manager 100 may include a communication mode interface module 102, a message parser module 104 and an enforcement module 106. In addition, the enforcement module 106 may include a message classification module 108 and an interruption module 110. The interruption manager 100 is not limited to the above example and may instead include additional modules and/or excluded modules discussed herein.

The communication mode interface module 102 may provide a single interface through which data received through multiple communication modes must pass. In other words, the communication mode interface module 102 may act as a communication conduit or funnel through which all communication channels send data. For example, the multiple communication modes may include an e-mail service, a text message service (or SMS), an instant message service, a phone service, etc. When the received content is not text-based (i.e., a voice message), the content may be transcribed into text for use by the interruption manager 100. One of ordinary skill in the art would understand that there are open APIs available for interacting with communication data associated with different communication modes. For example, the Unity Connection platform available from CISCO SYSTEMS, INC., San Jose, Calif. provides a mechanism for managing communication data received from multiple communication modes.

After receiving the communication data at the communication mode interface module 102, each instance of communication data may be forwarded to the message parser module 104. Each instance of communication data received is associated with attribute data. The attribute data may include, but is not limited to, information regarding the author (or source) of the communication data (i.e., the human dimension), information regarding the type of communication mode or characteristics of the communication data (i.e., the interaction dimension) and information regarding keywords within the communication data (i.e., the keyword dimension). The attribute data may be metadata associated with each instance of the communication data, for example. As discussed below, the attribute data may be used to determine the relative importance of the communication data, which may then be used to determine whether to interrupt the user by delivering the communication data.

The human dimension attribute data may be relevant to the relationship between the sender and recipient of the communication data. For example, the human dimension attribute data may reveal that the sender of the communication data is within the recipient's management chain, a direct or, indirect supervisor, a co-worker, a family member, a friend, a client, etc. The relationship may be determined using the recipient's address book and/or any other means such as an organizational directory, for example. In addition to the relationship, the human dimension attribute data may reveal information regarding the frequency of communication sent between the sender and recipient (i.e., the number of interactions over time). Accordingly, the human dimension attribute data may provide information regarding the relative importance of the communication data.

The interaction dimension attribute data may reveal the type of communication mode (i.e., e-mail, text message, instant message, voice message, etc.). In addition, the interaction dimension attribute data may reveal information regarding the size (or length) of the communication data and/or time of day information. The interaction dimension attribute data may be determined from the communication data itself. The interaction dimension attribute data may provide information regarding the relative importance of the communication data because the recipient may have a history of responding more quickly to communication data received through certain communication modes, communication data of certain lengths and/or communication data sent at certain times (i.e., times when the recipient is unoccupied).

The keyword dimension attribute data may reveal information about the content of the communication data, which may also provide information regarding the relative importance of the communication data. The keywords may be derived from the content of communication data sent/received by the recipient and/or provided by the recipient, for example. The keywords may be associated with communication data that the recipient is particularly interested in receiving. For example, the keywords may be associated with projects and/or subject matter on which the recipient is currently working. Alternatively or additionally, the keywords may be associated with subject matter on which the recipient considers particularly interesting such as news, sporting events, entertainment, and/or commercial information, for example. In a targeted marketing message, the keywords may be associated with a description of the goods and/or services, the place and/or time of availability or any other descriptive information related to the goods and/or services, such as details about a sale. The keyword dimension attribute data, which tends to be more subjective, may require more input from the user to train the interruption manager 100 in recognizing relevant keywords than the user input required with regard to the human dimension and interaction dimension attribute data.

Next, each instance of communication data may be forwarded to the message classification module 108. The message classification module 108 may classify each instance of communication data into one of a plurality of predetermined categories. For example, the predetermined categories may include five categories related to the level of importance of the communication data such as ignore, low, medium, high and urgent. There are many options available for classifying each instance of communication data. For example, the message classification module 108 may utilize an algorithm based on the user's historic communication pattern. The algorithm may account for how often and quickly the user responds to e-mails, instant message pings, voicemails, etc. By analyzing the attribute data associated with each instance of historic communication data, it may also be possible to account for differences in response times to communication data received from particular senders and/or related to particular subject matters. Alternatively, the message classification module 108 may utilize a reinforcement-learning algorithm. Example reinforcement-learning algorithms may be found in Van Hasslet, H., *A Short Introduction to Reinforcement Learning Algorithms*, http://homepages.cwi.nl/~hasselt/rl_algs/rl_algs.html. When using a reinforcement-learning algorithm, the message classification module 108 initially assumes that each instance of communication data has the same level of priority. Over time, the reinforcement-learning algorithm learns the right combination of input patterns using the attribute data associated with the communication data to classify the communication data according to its level of importance.

Optionally, the message classification module 108 may utilize a classification model constructed based on a set of historic communication data for use with a classification algorithm. The classification algorithm may be, for example, a decision tree classifier, a Naive-Bayes classifier, a hybrid decision tree-Naive-Bayes classifier, an SVM, etc. The set of historic communication data may include a plurality of instances of communication data. In addition, the set of historic communication data may include data associated with one or more communication modes. In some cases, increasing the size of the set of historic communication data may increase the accuracy obtained when using the classification algorithm to classify the received communication data.

A decision tree classifier uses a decision tree as a model to map attributes (i.e., the attribute data) of a received instance of communication data to conclusions about the predetermined category into which the instance of received communication data should be classified. The decision tree is typically constructed by recursive partitioning. For example, the decision tree may be constructed from the top-down by choosing the best attribute for splitting the set of historic communication data into subsets (i.e., child nodes) as the root (i.e., parent node) of the tree. At each subsequent step, the next best attribute is chosen for splitting each subset into further subsets. This process is typically repeated until further splitting no longer adds value to the prediction. A number of criterion may be utilized to determine how well a chosen attribute splits each set into subsets including, but not limited to, mutual information, gain-ratio, gini index, etc. Example decision tree algorithms are the C4.5 and C5.0 algorithms.

The Naive-Bayes classifier is based on Bayes' theorem. Specifically, the Naive-Bayes classifier utilizes Bayes' theorem to calculate the probability that a received instance of communication data belongs in each predetermined category. The Naive-Bayes classifier, however, begins with the assumption that the attributes (the attribute data) are conditionally independent (i.e., each of the attributes independently contributes to the probability that the instance of communication data belongs in each predetermined category). The Naive-Bayes classifier is discussed in detail in Youn et al., *A Comparative Study for Email Classification*, http://sir-lab.usc.edu/publications/Youn-CISSE.pdf and Cufoglu et al., *A Comparative Study of Selected Classification Accuracy in User Profiling*, ICMLA 787-91 (2008).

A hybrid decision tree-Naive-Bayes classifier may also be utilized. This may be particularly useful when the set of historic communication data is large. The hybrid approach attempts to capitalize on the advantages of both decision tree and Naive-Bayes classifiers. For example, the hybrid approach includes a decision tree having single attribute splits at each node and Naive-Bayes classifiers at the leaves. An example hybrid approach is discussed in detail in Kohavi, R., *Scaling Up the Accuracy of Naive-Bayes Classifiers: A Decision-Tree Hybrid*, KDD 202-07 (1996).

To construct the classification model, a set of historic communication data may be collected. As discussed above, the set of historic communication data may include a plurality of instances of communication data associated with one or more communication modes. In addition, each instance of communication data may be associated with the attribute data (i.e., human dimension, interaction dimension and keyword dimension attribute data). Further, the user may be asked to classify each instance of communication data included in the set of historic communication data into one of the predetermined categories such as ignore, low, medium, high and urgent, for example. After collecting all of the attribute data as well as the user input, the classification model may be constructed because the attribute data reveals information about the relative importance of each instance of communication data included in the set. The constructed classification model may then be used to classify each instance of subsequently received communication data into one of the predetermined categories using the attribute data associated with each instance of received communication data.

Upon classifying each instance of received communication data into one of the predetermined categories, the interruption module 110 may determine whether to interrupt the user based on the classification. For example, the user may enter an interruption threshold level, which may be associated with at least one of the predetermined categories. In some implementations, the user may select from non-available, busy, available, etc., for example. If the user selects "busy," which may be associated with category "high," the interruption module 110 may determine whether to interrupt the user based on the predetermined category of each instance of received communication data determined using the classification nodule 108. For example, if the instance of received communication data is categorized as high or urgent (i.e., equal to or greater than the selected interruption threshold level), then the instance of received communication data may be delivered to the user to interrupt the user. If, however, the instance of received communication data is categorized as ignore, low or medium (i.e., less than the selected interruption threshold level), the instance of received communication data may be saved in memory to the user to avoid interruption.

Figure 1B:
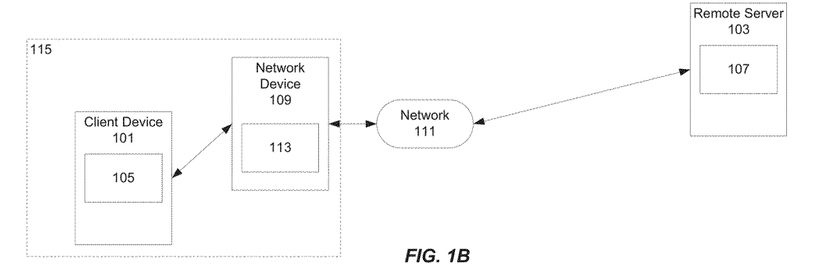
FIG. 1B is a simplified block diagram illustrating a system for providing access to the interruption manager of FIG. 1A.

Referring to FIG. 1B, a simplified block diagram illustrating a system for providing access to the interruption manager of FIG. 1A is shown. A client device 101 such as a computer, mobile computing device, tablet, etc. may be connected to a network 111 through a network device 109 such as a router, gateway, etc. The client device 101 and the network device 109 may be part of a local area network 115, which is shown by a dashed line in FIG. 1B. By connecting the client device 101 to the network 111, the client device 101 may be capable of communicating with a remote server 103. In some implementations, the remote server 103 may be connected to the network 111 via a local area network. The network 111 may be, for example, the Internet, and the client device 101, the remote server 103 and the network device 109 may be implemented as general computing devices as discussed below with regard to FIG. 5, or alternatively as specialized computing devices configured to perform specific tasks. In addition, the client device 101, the network device 109 and the remote server 103 may be connected to the network 111 by any type of connection, wired or wireless, including, but not limited to, an Ethernet, Wi-Fi, 3G or 4G connection. Alternatively, in some implementations, the client device 101 and the remote server 103 may be part of the same local area network.

The interruption manager 100 discussed with regard to FIG. 1A may be implemented using hardware, firmware, software, or any combination thereof. For example, the communication mode interface module 102, message parser module 104, enforcement module 106, message classification module 108 and interruption module 110 may be program code (i.e., computer-executable instructions) embodied in tangible computer readable media capable of being loaded into and executed by the client device 101, the network device 109 and/or the remote server 103. In this case, the modules may be included as application programs 105, 107, 113 stored on one or more of the client device 101, remote server 103 or network device 109.

Figure 2:
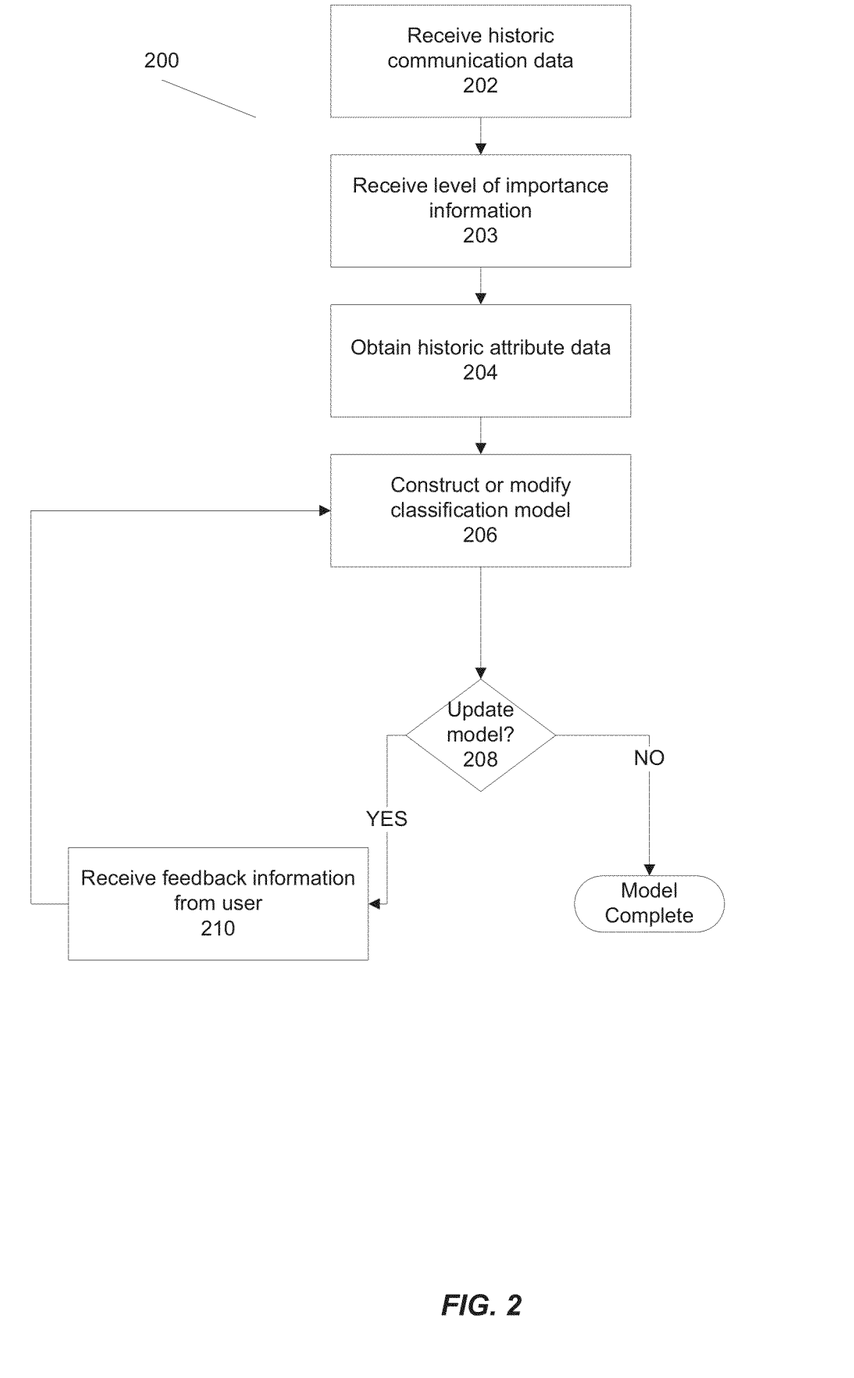
FIG. 2 is a flow diagram of example operations for constructing a classification model for use with the information manager of FIG. 1A.

Referring to FIG. 2, a flow diagram of example operations for constructing a classification model 200 for use with the interruption manager of FIG. 1A is shown. The classification model may be constructed for use with a classification algorithm (i.e., a decision tree, Naive-Bayes or a decision tree-Naive-Bayes classifier). The classification model preferably maps attributes associated with each instance of received communication data to a conclusion regarding the relative importance of each instance of communication data. For example, communication data sent by a user's direct supervisor may be more important, and therefore worthy of interrupting the user, than communication data sent by a friend. Alternatively or additionally, communication data related to a project on which the user is currently working may be more important than communication data related to an upcoming event. Accordingly, the classification model may be constructed by analyzing the attribute data associated with each instance of communication data included in a set of historic communication data where the user provides input regarding the relative importance of each instance of communication data included in the set.

At 202, a set of historic communication data may be received. As discussed above, the set may include a plurality of instances of communication data, and each instance of communication data may be associated with the attribute data. In addition, the set my include communication data associated one or more different modes of communication. The attribute data may provide additional information regarding the source, type and content of each instance of communication data. The attribute data may be human dimension, interaction dimension or keyword dimension attribute data, for example. At 203, the level of importance of each instance of communication data may be received. For example, in some implementations, there may be five different levels of importance (i.e., ignore, low, medium, high and urgent). However, there may be more or less different levels of importance. The level of importance of each instance of communication data may be provided by the user using an application program 105, 107, 113, for example.

At 204, the attribute data associated with each instance of communication data included in the set may be obtained.

Thereafter, at 206, the classification model may be constructed. Because the level of importance of each instance of communication data has been received, it may be possible to analyze the attribute data and determine which attributes are associated with communication data having higher levels of importance. Accordingly, the resulting classification model preferably maps attributes associated with each instance of received communication data to a conclusion regarding its relative importance.

At 208, a determination is made as to whether the classification model should be updated. If NO, the classification model may be used with the classification algorithm in order to classify each instance of received communication data. If YES, the classification model may be updated. For example, at periodic intervals, the user may be provided with a list of communication data classified using the classification algorithm. In particular, the list may indicate each instance of communication data including the source, type, description of content, etc. along with the predetermined category (i.e., the level of importance) assigned using the classification algorithm. The user may then provide feedback regarding the accuracy of the predetermined categories assigned using the classification algorithm. This feedback data may be used to modify the classification model at 206.

Figure 3:
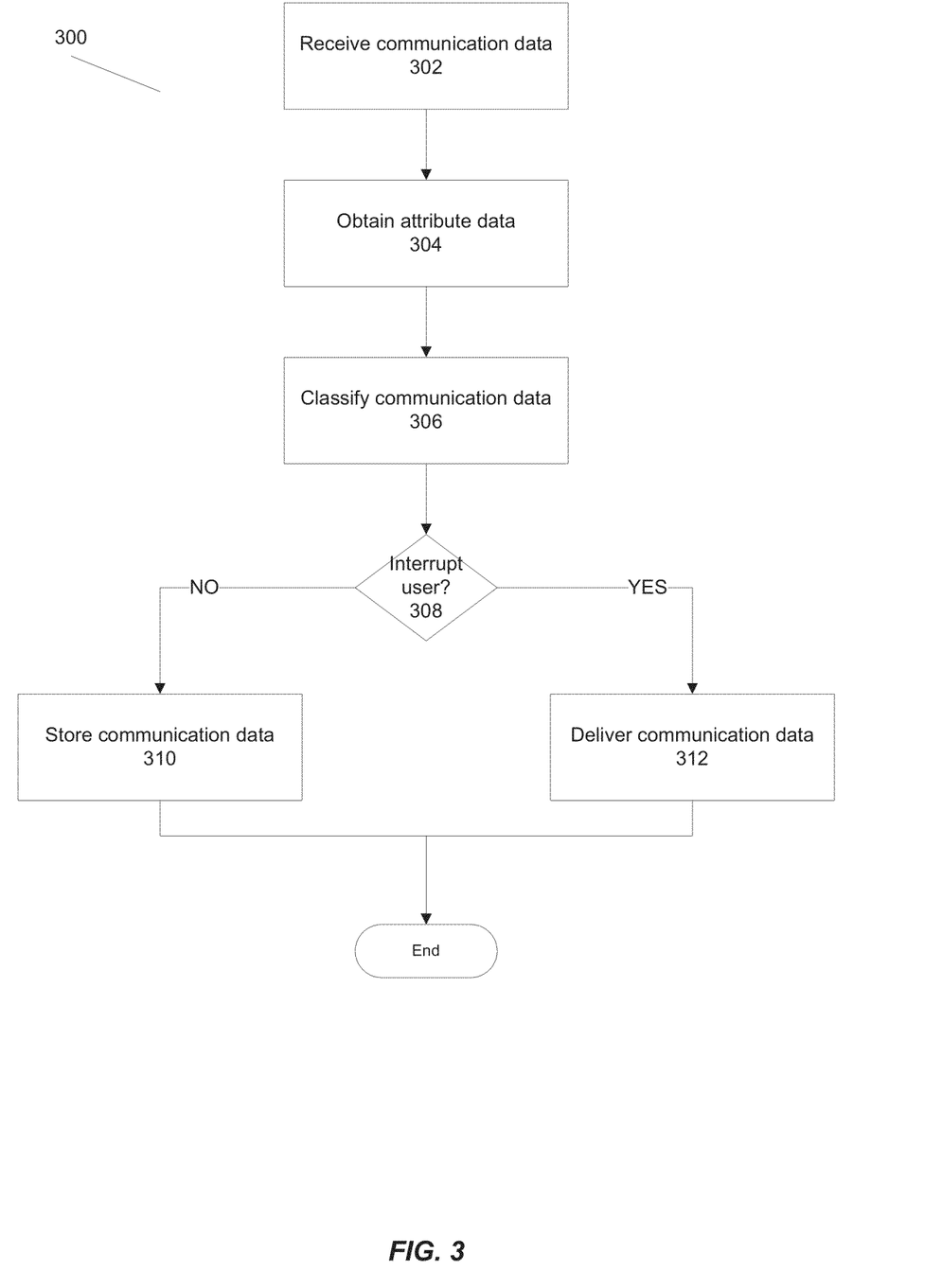
FIG. 3 is a flow diagram illustrating example operations for managing interruptions with the interruption manager of FIG. 1A.

Referring to FIG. 3, a flow diagram of example operations for managing interruptions 300 using the interruption manager of FIG. 1A is shown. As discussed above, the classification model may map attributes associated with each instance of received communication data with a conclusion about its relative importance. At 302, an instance of communication data may be received. In addition, each instance of communication data may be associated with a different communication mode. For example, communication modes may include e-mail, text messaging, instant messaging, voicemail, etc. However, communication data associated with the different communication modes are received at the same communication mode interface module (i.e., the communication mode interface module of FIG. 1A, for example). At 304, the attribute data associated with the instance of received communication data may be obtained. Thereafter, at 306, the instance of received communication data may be classified into one of a plurality of predetermined categories using the classification algorithm. The predetermined categories may be related to the relative importance of the communication data (i.e., ignore, low, medium, high or urgent). As discussed above, the instance of received communication data may be classified using a classification algorithm such as a decision tree classifier, a Naive-Bayes classifier or a decision tree-Naive-Bayes classifier, for example. The classification algorithm preferably maps attributes associated with the instance of received communication data (i.e., the attribute data) conclusion about the relative importance of the received communication data, such as ignore, low, medium, high or urgent.

After classifying the instance of received communication data, a determination is made as to whether to interrupt the user. If YES, the instance of received communication data is delivered to the user at 312. In this case, the user is interrupted. If NO, the instance of received communication data may be stored in a memory, for example, to avoid interrupting the user at 310. In this case, the user may gain access to the instance of received communication data at a later time.

Figure 4:
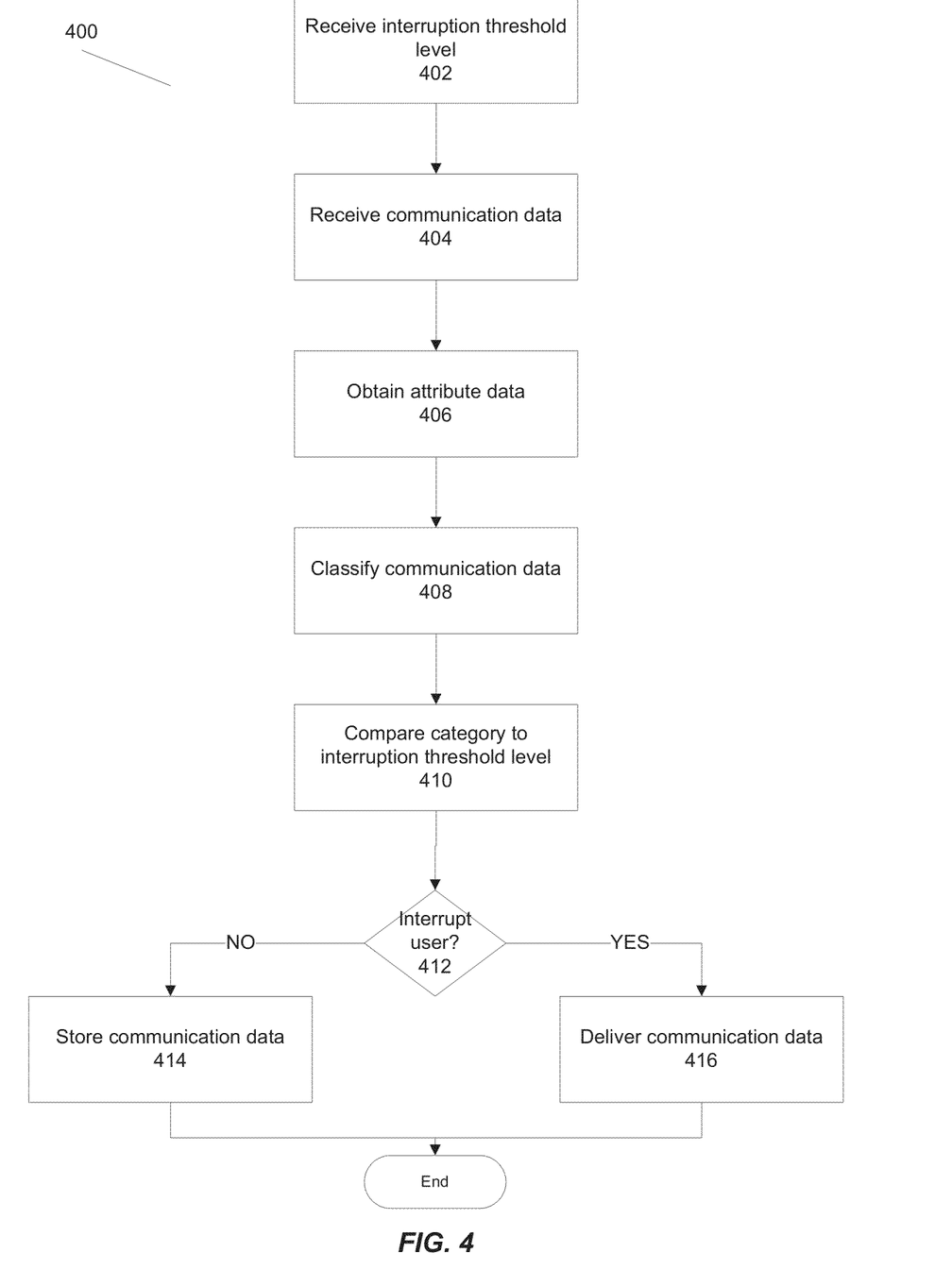
FIG. 4 is a flow diagram illustrating example operations for managing interruptions with the interruption manager of FIG. 1A.

Referring to FIG. 4, a flow diagram of example operations for managing interruptions 400 using the interruption manager of FIG. 1A is shown. At 402, an interruption threshold level of the user my be received. For example, the user may select among a predetermined number of interruption threshold levels, such as non-available, busy, available, etc. Each interruption threshold level may be associated with one or more of the predetermined categories (i.e., ignore, tow, medium, high or urgent). For example, interruption threshold level "available" may be associated with category "low." In this case, the user may be interrupted when receiving communication data categorized as "low," "medium," "high" or "urgent." However, the user may not be interrupted when receiving communication data categorized as "ignore." One of ordinary skill in the art would understand that the number of interruption threshold levels, the number of predetermined categories and the associations between the interruption threshold levels and predetermined categories are variable.

At 404, an instance of communication data my be received. As discussed above, the instance of received communication data may be associated with one of the different communication modes. At 406, the attribute data associated with the instance of received communication data may be obtained. Thereafter, at 408, the instance of received communication data may be classified into one of the predetermined categories using a classification algorithm, for example. After classifying the instance of received communication data, a determination may be made as to whether to interrupt the user at 412. For example, at 410, in order to make the determination, the category (i.e., ignore, tow, medium, high or urgent) may be compared to the selected interruption threshold level (i.e., not-available, busy, available, etc.), which is associated with one or more of the predetermined categories. For example, the interruption threshold level "available" may be associated with the category "low." Therefore, if the instance of received communication is categorized into a category equal to or greater than the interruption threshold level (i.e., low, medium, high or urgent), the user may be interrupted. However, if the instance of received communication data is categorized into a category less than the interruption threshold level (i.e., ignore), the user may not be interrupted. Similarly to the operations shown in FIG. 3, if the user is to be interrupted, the instance of received communication data may be delivered in the user at 416. If the user is not to be interrupted, the instance of received communication data may be stored in a memory, for example, to avoid interrupting the user at 414. In this case, the user may gain access to the instance of received communication data at a later time.

Figure 5:
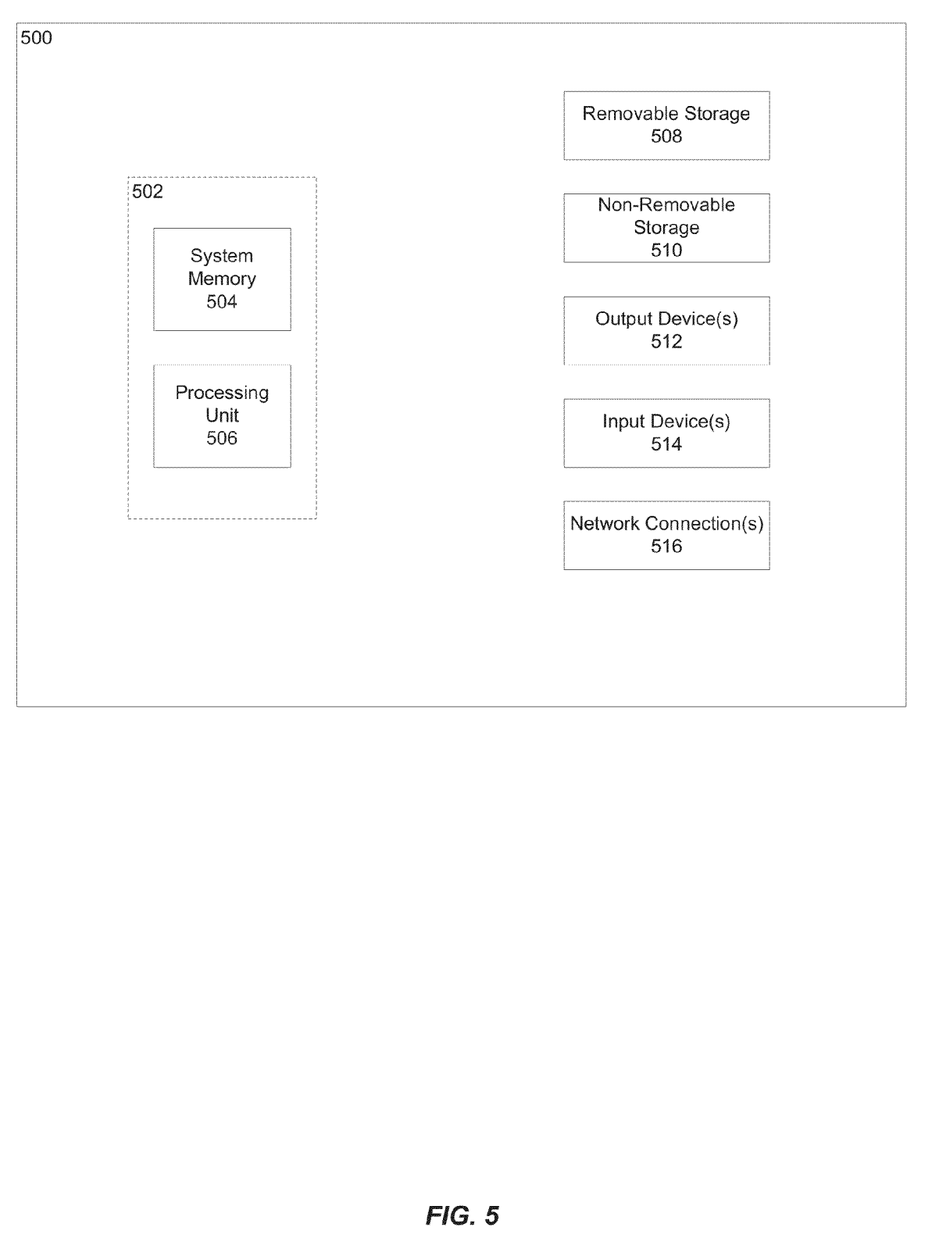
FIG. 5 is an example computing device according to an implementation of the invention.

Referring to FIG. 5, an example computing device is illustrated. The client device, network device and/or server discussed above may be computing devices, such as computing device 500 shown in FIG. 5. In its most basic configuration, computing device 500 typically includes at least one processing unit 506 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 502. The processing unit may be a standard programmable processor that performs arithmetic and logic operations necessary for operation of the computing device 500.

The processing unit 506 may be configured to execute program code encoded in tangible, computer-readable media. For example, the processing unit 506 may execute program code stored in the system memory 504.

Computing device 500 may have additional features/functionality. For example, computing device 500 may include additional storage such as removable storage 508 and non-removable storage 510 including, but not limited to, magnetic or optical disks or tapes. Computing device 500 may also contain network connection(s) 516 that allow the device to communicate with other devices. Computing device 500 may also have input device(s) 514 such as a keyboard, mouse, touch screen, etc. Output device(s) 514 such as a display, speakers, printer, etc. may also be included. All these devices are well known in the art and need not be discussed at length here.

Computing device 500 typically includes a variety of computer readable media. Computer readable media can be any available media that can be accessed by device 500 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which cat be used to store the desired information and which can be accessed by computing device 500. Any such computer storage media may be part of computing device 500.

It should be understood that the various techniques described herein may be implemented in connection with hardware, firmware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A method, comprising:
  receiving a set of historical communication data associated with at least one communication mode, the set of historical communication data including a plurality of instances of communication data;
  obtaining respective attribute data associated with each instance of communication data;

constructing a classification model for a classification algorithm using the respective attribute data;

receiving at least a first instance of communication data through a first communication mode and a second instance of communication data through a second communication mode, the first communication mode being different than the second communication mode;

obtaining first attribute data related to the first instance of communication data and second attribute data related to the second instance of communication data;

classifying the first instance of communication data into a first category based on the first attribute data and the second instance of communication data into a second category based on the second attribute data, the first category and the second category being selected from a plurality of predetermined categories using the classification algorithm, wherein each of the predetermined categories is related to a relative importance of a respective instance of the communication data;

determining whether to interrupt a user based on the first and second categories, respectively; and upon determining to interrupt the user, interrupting the user by delivering the first instance of communication data or the second instance of communication data.

2. The method of claim 1, further comprising storing the first instance of communication data or the second instance of communication data under the condition that the user is not to be interrupted.

3. The method of claim 1, wherein the first and second categories are a same or a different one of the predetermined categories.

4. The method of claim 1, further comprising receiving an interruption threshold level, the interruption threshold being associated with at least one of the predetermined categories, wherein:

determining whether to interrupt a user further comprises comparing the first category and the second category to the interruption threshold level; and interrupting the user further comprises delivering the first instance of communication data or the second instance of communication data when the first category or the second category equals or exceeds the interruption threshold level, respectively.

5. The method of claim 1, further comprising:

receiving feedback from the user regarding accuracy of results of the classification; and modifying the classification model based on the feedback.

6. The method of claim 1, wherein the classification algorithm comprises at least one of a data tree classification, a Naive-Bayes classification or a hybrid data tree-Naive-Bayes classification.

7. The method of claim 1, wherein each of the first attribute data and the second attribute data comprise at least one of information related to an author of the first or second instance of communication data, respectively, a type of communication mode with which the first or second instance of communication data, respectively, is associated or a descriptive keyword included in the first or second instance of communication data, respectively.

8. The method of claim 1, wherein an environment in which the method operates includes multiple communication modes that comprise at least one of an email service, a text message service, an instant message service or a voice message service.

9. The method of claim 1, wherein the first instance of communication data and the second instance of communication data comprise a targeted marketing message.

10. A non-transitory computer-readable recording medium having computer-executable instructions stored thereon that, when executed by a computing device cause the computing device to:

receive a set of historical communication data associated with at least one communication mode, the set of historical communication data including a plurality of instances of communication data;

obtain respective attribute data associated with each instance of communication data;

construct a classification model for a classification algorithm using the respective attribute data;

receive at least a first instance of communication data through a first communication mode and a second instance of communication data through a second communication mode, the first communication mode being different than the second communication mode;

obtain first attribute data related to the first instance of communication data and second attribute data related to the second instance of communication data;

classify the first instance of communication data into a first category based on the first attribute data and the second instance of communication data into a second category based on the second attribute data, the first category and the second category being selected from a plurality of predetermined categories using the classification algorithm, wherein each of the predetermined categories is related to a relative importance of a respective instance of the communication data;

determine whether to interrupt a user based on the first and second categories, respectively; and upon determining to interrupt the user, interrupt the user by delivering the first instance of communication data or the second instance of communication data.

11. The non-transitory computer-readable recording medium of claim 10 further comprising computer-executable instructions to store the first instance of communication data or the second instance of communication data under the condition that the user is not to be interrupted.

12. The non-transitory computer-readable recording medium of claim 10 further comprising computer-executable instructions to receive an interruption threshold level at the computing device, the interruption threshold being associated with at least one of the predetermined categories, wherein:

determining whether to interrupt a user further comprises comparing the first category and the second category to the interruption threshold level; and interrupt the user further comprises delivering the first instance of communication data or the second instance of communication data when the first category or the second category equals or exceeds the interruption threshold level, respectively.

13. The non-transitory computer-readable recording medium of claim 10 further comprising computer-executable instructions to:

receive feedback from the user regarding accuracy of results of the classification; and modify the classification model based on the feedback.

14. The non-transitory computer-readable recording medium of claim 10, wherein each of the first attribute data and the second attribute data comprise at least one of information related to an author of the first or second instance of communication data, respectively, a type of communication mode with which the first or second instance of communication data, respectively, is associated or a descriptive keyword included in the first or second instance of communication data, respectively.

15. The non-transitory computer-readable recording medium of claim 10, wherein the first instance of communication data and the second instance of communication data comprise a targeted marketing message.

16. An interruption management device, comprising:
a memory; and
a processor including:
  a communication mode interface module configured to receive at least a first instance of communication data through a first communication mode and a second instance of communication data through a second communication mode, the first communication mode being different than the second communication mode;
  a message parser module configured to obtain first attribute data related to the first instance of communication data and second attribute data related to the second instance of communication data;
  a classification module configured to:
    receive a set of historical communication data associated with at least one communication mode, the set of historical communication data including a plurality of instances of communication data,
    obtain respective attribute data associated with each instance of communication data,
    construct a classification model for a classification algorithm using the respective attribute data, and
    classify the first instance of communication data into a first category based on the first attribute data and the second instance of communication data into a second category based on the second attribute data, the first category and the second category being selected from a plurality of predetermined categories using the classification algorithm, wherein each of the predetermined categories is related to a relative importance of a respective instance of the communication data; and
  an interruption module configured to determine whether to interrupt a user based on the first and second categories, respectively, and upon determining to interrupt the user, interrupt the user by delivering the first instance of communication data or the second instance of communication data, wherein the first instance of communication data or the second instance of communication data is stored in the memory under the condition that the user is not to be interrupted.

17. The interruption management device of claim 16, wherein:
the processor is further configured to receive an interruption threshold level, the interruption threshold being associated with at least one of the predetermined categories; and
the interruption module is further configured to compare the first category and the second category to the interruption threshold level and to interrupt the user by delivering the first instance of communication data or the second instance of communication data when the first category or the second category equals or exceeds the interruption threshold level, respectively.

* * * * *